Dec. 29, 1970   C. E. QUISENBERY   3,550,995
ADJUSTABLE BICYLE TANK

Filed Jan. 23. 1969

INVENTOR.
CARTER E. QUISENBERRY
BY
*Walter Lewis*
ATTORNEY

Dec. 29, 1970  C. E. QUISENBERRY  3,550,995
ADJUSTABLE BICYLE TANK
Filed Jan. 23. 1969  2 Sheets-Sheet 2
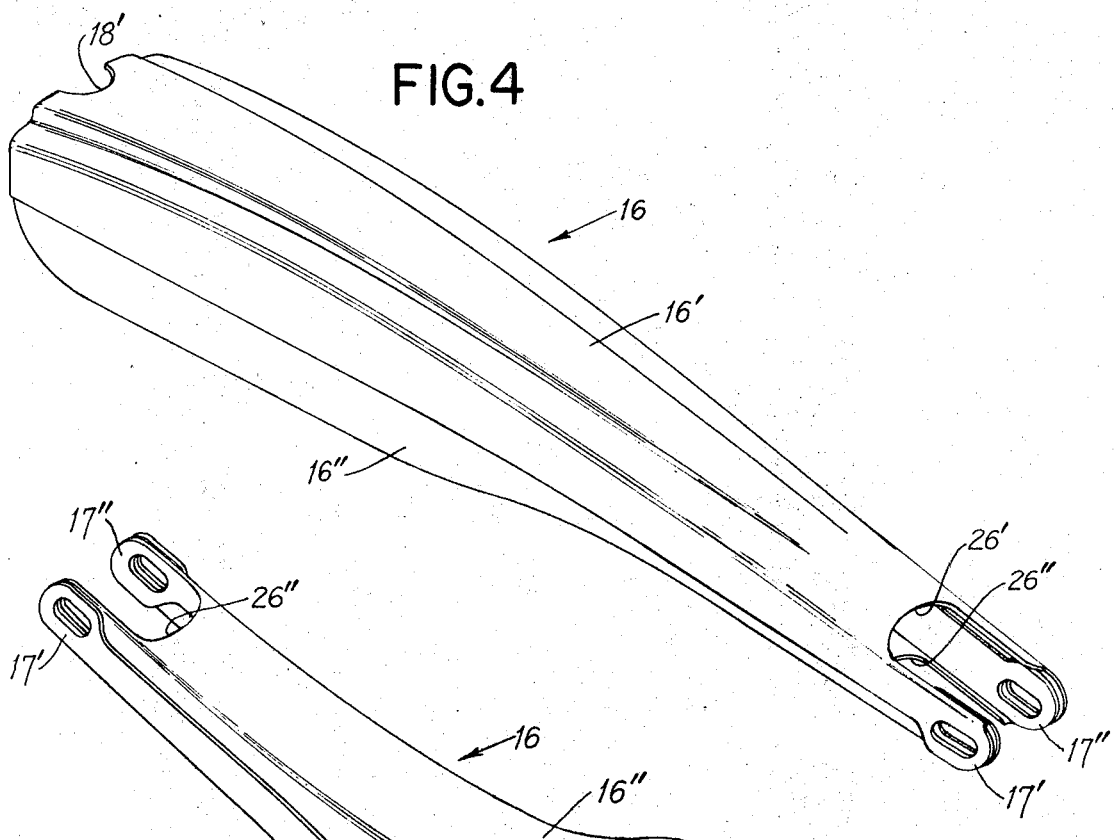
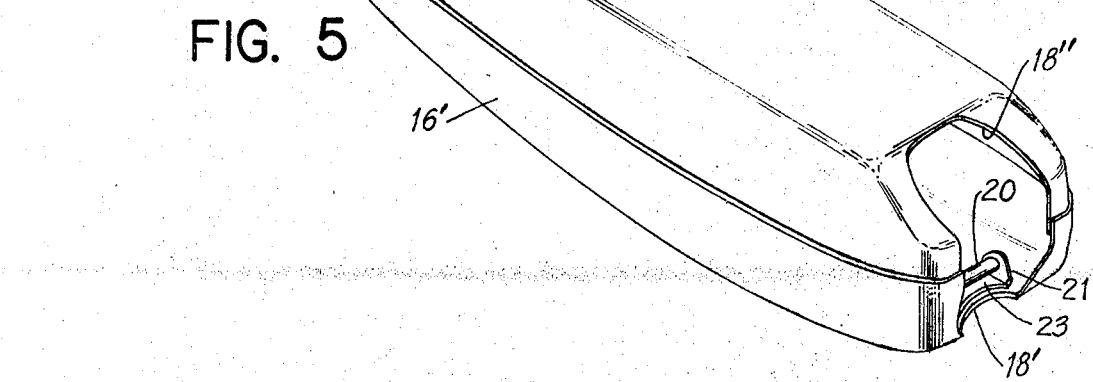
INVENTOR.
CARTER E. QUISENBERRY
BY *Walter Lewis*
ATTORNEY

United States Patent Office 3,550,995
Patented Dec. 29, 1970

3,550,995
ADJUSTABLE BICYCLE TANK
Carter E. Quisenberry, Olney, Ill., assignor to American Machine & Foundry Company, a corporation of New Jersey
Filed Jan. 23, 1969, Ser. No. 793,323
Int. Cl. B62k 13/08
U.S. Cl. 280—7.11      1 Claim

ABSTRACT OF THE DISCLOSURE

A bicycle tank is adjustable by being pivotally mounted at its front end so that it can be converted for use with a boy's or girl's bike. Conversion is accomplished by pivotally raising or lowering its rear end and removably fastening the rear end in set position.

---

This invention relates to an adjustable bicycle tank, and more particularly, to a bicycle tank which can be adjusted to convert it for use with a boy's or girl's bike.

It is an object of this invention to provide an adjustable bicycle tank which is low cost and can be readily converted for use with a boy's or girl's bike.

Briefly, in the invention the front end of the tank has a rattle free pivotal connection with the front steering post of a bicycle frame. The tank is adapted to be converted for use with a boy's or girl's bike merely by swinging it up or down respectively, as contrasted to the disassembly and reversing procedures of the prior art. At its rear end the tank is set in fixed position by connection to the bicycle frame at or near to the seat post.

The features of the invention which are believed to be novel are set forth with particularity in the appended claims. The invention itself, however, both as to its organization and operation, together with further objects and advantages thereof, may best be understood by reference to the following description taken in connection with the accompanying drawings in which:

FIG. 4 is an enlarged perspective view of the tank; and

FIG. 5 is another enlarged perspective view of the tank.

Figure 1:
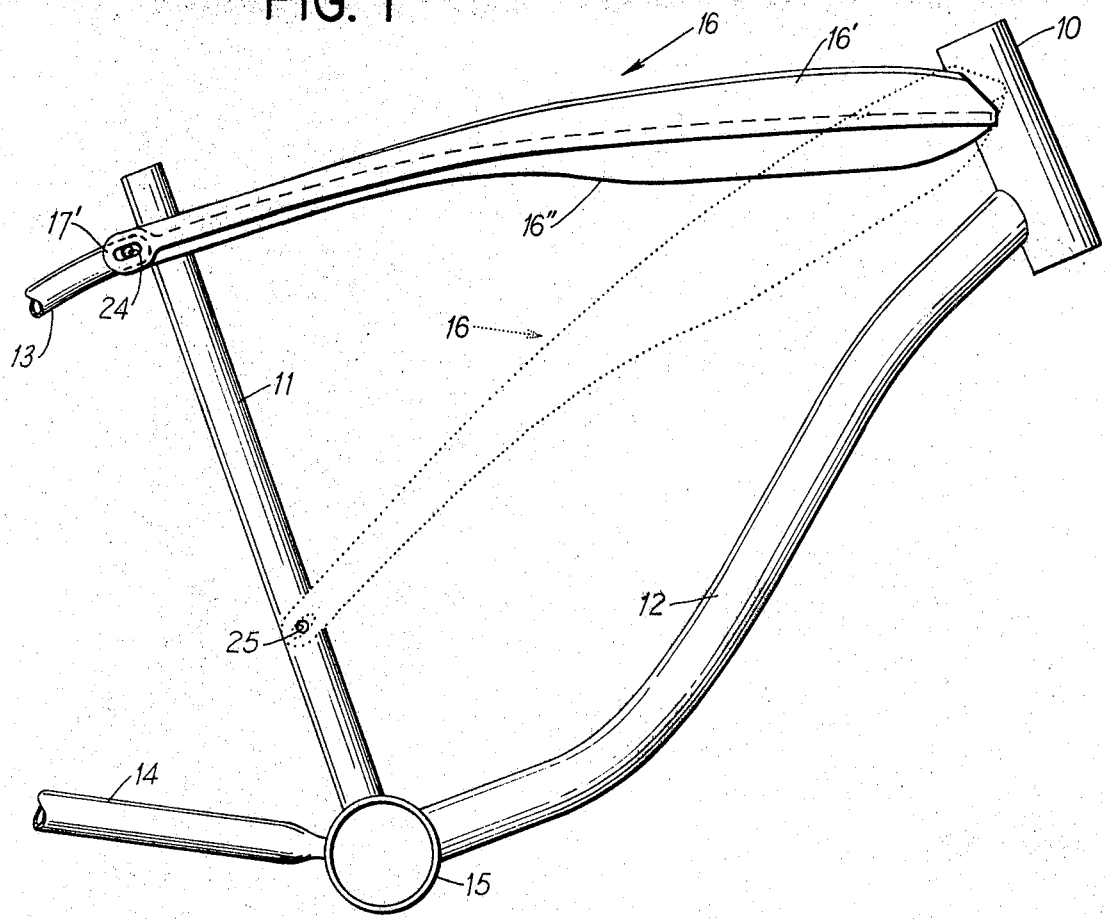
FIG. 1 is a side elevation view of part of a bicycle frame embodying the invention.

Referring now particularly to the drawings, illustrated therein is part of a bicycle frame comprising a front steering post tube 10, a seat post tube 11, a front bottom frame bar 12 which extends between the lower ends of tubes 10 and 11, and one or more rear top and bottom frame bars 13 and 14 respectively which extend rearwardly from the top and bottom respectively of the seat post 11. The details of the frame per se are more particularly shown in copending Loran R. Hill Design patent application Ser. No. 15,328, filed Jan. 13, 1969 for Bicycle Frame, now Des. 216,538, granted Feb. 3, 1970 and assigned to the same assignee as the instant invention. Briefly, there are a pair of bars 13 which are directly connected to the upper end of seat post 11. Also, there are a pair of bars 14, and bars 12 and 14 and seat post 11 are connected together by a horizontally disposed pedal crank receiving tube 15 in a manner which is well understood by those skilled in the bicycle art.

Figure 2:
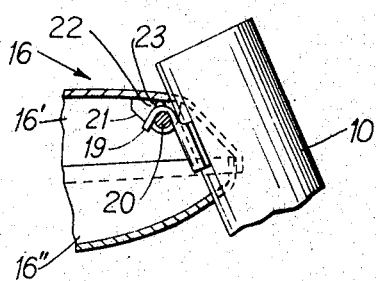
FIG. 2 is a partial view showing the position of the parts in the tank raised position.
Figure 3:
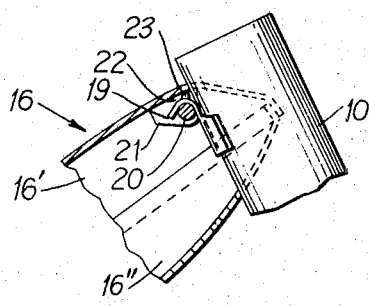
FIG. 3 is a view similar to that of FIG. 2 but showing the tank lowered position.

In the invention the upper ends of posts 10 and 11 are straddled by a tank 16. Tank 16 is adjustable. In its full line FIG. 1 and FIG. 2 position it is set for use with a boy's bike. In its lowered dotted line FIG. 1 and FIG. 3 position it is set for use with a girl's bike. That is to say, the adjustable tank 16 makes it possible to use the frame in a boy's or girl's bike.

The tank is a hollow elongated shell or housing made up from two halves 16' and 16" which are closed on each other. The rear ends of tank halves 16' and 16" have aligned apertured ears 17' and 17" respectively for fixing the rear end of tank 16 in set position. The front ends of the tank halves 16' and 16" have cutouts or notches 18' and 18" respectively so that the front or nose end of tank 16 can partially receive the steering post 10.

At its front end tank 16 is pivotally connected to the steering post 10. The pivotal connection comprises a hooked shaped hinge element 19 connected to the rear side of the steering post 10 and a hinge pin element 20 connected to the upper tank half 16'. The hinge pin 20 is suspended off the inside of the top wall of the tank half 16' by a U-shaped bracket 21.

The tank 16 is assembled into position by holding it near the frame bar 12 and hooking it on to the post 10 by hooking the hinge 19 on to the pin 20. There's a space 22 between the pin 20 and its overlying bracket 21 to pass the hinge 19 therebetween. This space 22 is in excess of the thickness of the hinge 19. An upstanding dimple or raised boss 23 is formed on the upper surface of the curved part of the hinge 19. This dimple 23 takes up the looseness in the space 22 beyond that required by the hook 19 so that in assembled position the front end of tank 16 does not move and rattle.

Holes 24 and 25 are formed in the frame for removably fixing the rear end of tank 16 in set position. The holes 24 are formed in the top bars 13 just behind the seat post 11 so as to be in alignment with the apertured ear 17', 17" when the tank 16 is in its raised boy's bicycle position. The hole 25 is formed in the lower end of the seat post 11 so as to be in alignment with the apertured ears 17', 17" when the tank 16 is moved to its lowered girl's bicycle position. Suitable not shown removable fastening means such as nuts and bolts or screws are intended to be inserted into the aligned apertured ears 17', 17" and holes 24 or 25 to fix the rear end of tank 14 in set adjusted position so that the bike is readily convertible from a boy's bike into a girl's bike.

At its rear end the tank halves 16' and 16" have cutouts or notches 26' and 26" respectively between the ears 17' and 17". These notches 26' and 26" make it possible for the apertured ears 17', 17" to straddle the seat post 11 and swing the rear end of the tank between raised and lowered position for alignment with the holes 24, 25.

It will now be seen that the invention provides a tank for converting a bicycle frame into a boy's or girl's bike at a very low cost and with a minimum number of parts. The conversion is very quickly accomplished merely by swinging the tank up or down and making a simple screw or nut and bolt connection. Also, the assembly is rattle free and requires no special tools, or major disassembly and reversing procedure as in the prior art.

While there has been shown and described a particular embodiment of the invention, it will be obvious to those skilled in the art that changes and modifications may be made without departing from the invention, and that it is intended by the appended claim to cover all such changes and modifications as fall within the true spirit and scope of the invention.

I claim:

1. In a bicycle frame having spaced steering and seat posts, and a tank straddling said posts, means for converting said frame into a boy's or girl's bike, said means comprising an adjustable mounting for said tank, said adjustable mounting comprising a pivotal connection between the front end of said tank and said steering post for swinging the rear end of said tank into raised or lowered position, and removable means for fastening the rear end of said tank to said frame, said tank comprising a hollow elongated housing, the front end of said housing being open, a hinge pin mounted inside the front end of said housing, a hook on said steering post which is adapted to be hooked on to said pin, and a pair of spaced apertured ears formed at the rear end of said housing which are adapted to straddle said seat post, a hole formed in the lower end of said seat post and in said frame behind the upper end of said seat post for fixing said ears to said frame in the lowered and raised position of said tank, a U-shaped bracket for mounting said pin inside said tank, said hook being adapted to enter a space between said pin and bracket, and a raised formation formed on said hook for taking up any looseness in said space beyond that required by the thickness of said hook.

References Cited

UNITED STATES PATENTS

| | | | |
|---|---|---|---|
| 1,744,417 | 1/1930 | Schwartz | 280—7.11 |
| 2,440,091 | 4/1948 | Hoyt | 280—287 |
| 2,827,301 | 3/1958 | Stevens | 280—7.11 |
| 3,088,747 | 5/1963 | Hahn | 280—7.11 |

BANJAMIN HERSH, Primary Examiner

M. L. SMITH, Assistant Examiner